(12) United States Patent
Wu et al.

(10) Patent No.: US 11,575,710 B2
(45) Date of Patent: Feb. 7, 2023

(54) OUTPUT-DECISION-BASED NEGATIVE FEEDBACK CONTROL METHOD AND SYSTEM

(71) Applicants: SHANGHAI HONGZHEN INFORMATION SCIENCE & TECHNOLOGY CO., LTD., Shanghai (CN); CHINA NATIONAL DIGITAL SWITCHING SYSTEM ENGINEERING & TECHNOLOGICAL R&D CENTER, Henan (CN)

(72) Inventors: Jiangxing Wu, Zhengzhou (CN); Lei He, Zhengzhou (CN); Fan Zhang, Zhengzhou (CN); Peng Yi, Zhengzhou (CN); Guozhen Cheng, Zhengzhou (CN); Yongji Dong, Zhengzhou (CN); Peijie Li, Zhengzhou (CN); Junfei Li, Zhengzhou (CN); Jinling Li, Zhengzhou (CN); Ting Chen, Zhengzhou (CN); Ruihao Ding, Zhengzhou (CN); Quan Ren, Zhengzhou (CN); Jie Gao, Zhengzhou (CN)

(73) Assignees: SHANGHAI HONGZHEN INFORMATION SCIENCE & TECHNOLOGY, Minhang District (CN); CHINA NATIONAL DIGITAL SWITCHING SYSTEM ENGINEERIN, Henan (CN)

( * ) Notice: Subject to any disclaimer, the term of this patent is extended or adjusted under 35 U.S.C. 154(b) by 406 days.

(21) Appl. No.: 16/314,315

(22) PCT Filed: Sep. 1, 2017

(86) PCT No.: PCT/CN2017/100200
§ 371 (c)(1),
(2) Date: Dec. 28, 2018

(87) PCT Pub. No.: WO2019/015029
PCT Pub. Date: Jan. 24, 2019

(65) Prior Publication Data
US 2021/0226994 A1 Jul. 22, 2021

(30) Foreign Application Priority Data

Jul. 19, 2017 (CN) .......................... 201710590045.2

(51) Int. Cl.
*H04L 9/40* (2022.01)
*G06K 9/62* (2022.01)
*G06N 5/00* (2006.01)

(52) U.S. Cl.
CPC ............ *H04L 63/20* (2013.01); *G06K 9/6262* (2013.01); *G06N 5/003* (2013.01); *H04L 63/0263* (2013.01); *H04L 63/1433* (2013.01)

(58) Field of Classification Search
CPC . H04L 63/20; H04L 63/0263; H04L 63/1433; G06K 9/6262; G06N 5/003
See application file for complete search history.

(56) References Cited

U.S. PATENT DOCUMENTS

| 8,799,986 B2 | 8/2014 | Rissanen |
| 2006/0117210 A1 | 6/2006 | Alcatel |

(Continued)

FOREIGN PATENT DOCUMENTS

| CN | 106156631 A | 11/2016 |
| CN | 106161417 A | 11/2016 |

(Continued)

OTHER PUBLICATIONS

International Search Report and Written Opinion for Application No. PCT/CN2017/100200.

(Continued)

*Primary Examiner* — Joseph L Greene
(74) *Attorney, Agent, or Firm* — Reising Ethington, P.C.

(57) ABSTRACT

An output-decision-based negative feedback control method and system. The method includes: receiving, by an output decider, output responses of at least two heterogeneous functional equivalents, and dividing numbers corresponding (Continued)

to the at least two heterogeneous functional equivalents into at least one set according to the output responses; determining, by the output decider, credibility of each set according to the output responses, and sending the at least one set and the credibility corresponding to each set to a feedback controller via decision information; generating, by the feedback controller, a first scheduling policy and/or a second scheduling policy according to the decision information; and sending, by the feedback controller, the first scheduling policy to an input proxy, and/or sending a change instruction to the heterogeneous functional equivalent indicated by the second scheduling policy. The method can prevent in advance and process a heterogeneous functional equivalent that may be faulty.

10 Claims, 2 Drawing Sheets

(56) References Cited

U.S. PATENT DOCUMENTS

| 2016/0302023 | A1* | 10/2016 | Stoner | H04W 4/60 |
| 2016/0352770 | A1 | 12/2016 | Wu et al. | |
| 2018/0115551 | A1* | 4/2018 | Cole | H04L 63/083 |
| 2018/0165781 | A1* | 6/2018 | Rodriguez | G06Q 20/3672 |
| 2018/0176281 | A1* | 6/2018 | Arunachalam | H04L 69/22 |

FOREIGN PATENT DOCUMENTS

| CN | 106161418 A | 11/2016 |
| CN | 106534063 A | 3/2017 |
| CN | 106549935 A | 3/2017 |
| CN | 106713262 A | 5/2017 |

OTHER PUBLICATIONS

Ana Cristina Oliveira et. al; Adaptive Sabotage-Tolerant Scheduling for Peer-to Peer Grids; 2009 Fourth Latin-American Symposium on Dependable Computing; ISBN: 978-1-4244-4678-0; Sep. 1, 2009; 8 pages.

Extended Search Report issued for the application EP 17908761.4 dated Jan. 30, 2020; 7 pages.

Hu Hongchao; Performance Evaluations on DHR for Cyberspace Mimic Defense; National Digital Switching System Engineering & Technological R & D Centre; 1994-2019 China Academy Journal Electronic Publishing House; Journal of Cyber Security vol. 1 No. 4; Oct. 2016; 12 pages.

* cited by examiner

OUTPUT-DECISION-BASED NEGATIVE FEEDBACK CONTROL METHOD AND SYSTEM

The present disclosure claims priority to Chinese Patent Application No. 201710590045.2, filed with the Chinese Patent Office on Jul. 19, 2017 and entitled "OUTPUT-DECISION-BASED NEGATIVE FEEDBACK CONTROL METHOD AND SYSTEM", which is incorporated herein by reference in its entirety.

TECHNICAL FIELD

The present disclosure relates to a field of security defense technologies in cyberspace, and in particular, to an output-decision-based negative feedback control method and system.

BACKGROUND

Computers and the cyberspace environment composed of computers bring great convenience to people's life, work, and study. The cyberspace environment composed of computers includes a network equipment terminal (e.g., a mobile phone or a computer), network-related software (e.g., a browser or communication software) executing on the terminal, a server, and various equipment (e.g., a switch and a router) providing interconnections for the network, and the like. The software and hardware apparatuses in the cyberspace may be a system, a sub-system, a unit, a module, a component, and even a device. The structural state presented externally by these software and hardware apparatuses is referred to as structural characterization.

In the existing cyberspace, the software and hardware apparatuses that provide given service functions usually have a lot of unknown vulnerabilities and backdoors. If the apparatuses in the cyberspace are not to be checked in time, the network security would be threatened once these vulnerabilities and backdoors are took advantage by attackers. In addition, if it is not able to detect in time a network equipment that may be faulty or being attacked, the service function provided by the network equipment may affect the overall performance of the software and hardware apparatuses.

SUMMARY

This disclosure provides an output-decision-based negative feedback control method and system in order to schedule heterogeneous functional equivalents in a network system to improve network security and reliability.

According to a first aspect, this disclosure provides an output-decision-based negative feedback control method, including:

receiving, by an output decider, output responses of at least two heterogeneous functional equivalents, and dividing numbers corresponding to the at least two heterogeneous functional equivalents into at least one set according to the output responses;

determining, by the output decider, credibility of each set according to a decision algorithm, and sending the at least one set and the credibility corresponding to each set to a feedback controller via decision information;

receiving, by the feedback controller, the decision information, and generating a first scheduling policy and/or a second scheduling policy according to the decision information, where the first scheduling policy is used to indicate the number corresponding to the heterogeneous functional equivalent that is to be scheduled, and the second scheduling policy is used to indicate the number corresponding to the heterogeneous functional equivalent that is to be changed; and sending, by the feedback controller, the first scheduling policy to an input proxy, and/or sending a change instruction to the heterogeneous functional equivalent indicated by the second scheduling policy.

With reference to the first aspect, in an implementation, the decision algorithm includes a majority decision and a weighted decision, and the determining by the output decider of the credibility of each set according to the decision algorithm includes: determining, by the output decider, the credibility of each set according to the majority decision or the weighted decision. Optionally, the output decider acquires a decision parameter, where the decision parameter includes at least one of a weight of each of the heterogeneous functional equivalents and a target parameter, and the output decider may determine the credibility of each set according to the decision algorithm and the decision parameter.

With reference to the first aspect, in another implementation, the credibility is used to indicate a state of each of the heterogeneous functional equivalents in each set is credible, non-credible, or intermediate between credible and non-credible; and the generating by the feedback controller of a first scheduling policy and/or a second scheduling policy according to the decision information includes:

counting, by the feedback controller, a quantity of the heterogeneous functional equivalents in the non-credible state and a quantity of the heterogeneous functional equivalents in the intermediate state; determining whether each of the quantities exceeds a preset value, respectively; and if the quantity exceeds the preset value, configuring and generating the first scheduling policy and/or the second scheduling policy according to the numbers corresponding to heterogeneous functional equivalents in the non-credible and intermediate states; or acquiring, by the feedback controller, an external control parameter, and generating the first scheduling policy and/or the second scheduling policy according to the external control parameter and the decision information.

With reference to the first aspect, in still another implementation, the method further includes: receiving, by the input proxy, the first scheduling policy, and replacing the heterogeneous functional equivalent according to the number corresponding to the heterogeneous functional equivalent indicated by the first scheduling policy.

With reference to the first aspect, in still another implementation, that the second scheduling policy is used to indicate the number of the heterogeneous functional equivalent that is to be changed includes: the second scheduling policy is used to instruct the heterogeneous functional equivalent that is to be changed to perform a change of disconnecting, initializing, abnormality recovering, refactoring or restructuring.

In the method provided in this aspect, the output decider sends the collected and analyzed output responses of the heterogeneous functional equivalents to the feedback controller after division, so that the feedback controller can generate the scheduling policy according to the decision information, and perform operations such as replacing, cleaning, recovering, refactoring or restructuring on the heterogeneous functional equivalent that may be faulty or at a low credibility. In this way, the output responses of all of the heterogeneous functional equivalents in the system tend to be consistent, and the heterogeneous functional equivalent in which a fault may occur is known beforehand and thus processed, thereby avoiding the fault to be discovered and processed until it occurs. This method improves reliability and security of the software and hardware apparatuses.

In addition, in the method provided in this disclosure, by scheduling and changing the selected heterogeneous functional equivalent, collaborative cheating among a plurality of heterogeneous functional equivalents can also be avoided, and the security of the system is further improved.

According to a second aspect, this disclosure further provides an output-decision-based negative feedback control system, including: an input proxy, at least two heterogeneous functional equivalents, an output decider, and a feedback controller.

Each of the heterogeneous functional equivalents is configured to generate an output response according to an external service request, and send the output response to the output decider.

The output decider includes a transceiver and a processor, where the transceiver is configured to receive the output responses of the at least two heterogeneous functional equivalents; and the processor is configured to divide numbers corresponding to the at least two heterogeneous functional equivalents into at least one set according to the output responses, and to determine credibility of each set according to a decision algorithm, and the transceiver is further configured to send the at least one set and the credibility corresponding to each set to the feedback controller via decision information.

The feedback controller includes a transceiver and a processor, where the transceiver is configured to receive the decision information, and the processor is configured to generate a first scheduling policy and/or a second scheduling policy according to the decision information, where the first scheduling policy is used to indicate the number corresponding to the heterogeneous functional equivalent that is to be scheduled, and the second scheduling policy is used to indicate the number corresponding to the heterogeneous functional equivalent that is to be changed; and the transceiver is further configured to send the first scheduling policy to the input proxy, and/or send a change instruction to the heterogeneous functional equivalent indicated by the second scheduling policy.

With reference to the second aspect, in an implementation, the decision algorithm includes a majority decision and a weighted decision; and the processor of the output decider is specifically configured to determine the credibility of each set according to the majority decision or the weighted decision.

With reference to the second aspect, in another possible implementation, the credibility is used to indicate a state of each of the heterogeneous functional equivalents in each set is credible, non-credible, or intermediate between credible and non-credible.

The processor of the feedback controller is specifically configured to count a quantity of the heterogeneous functional equivalents in the non-credible state and a quantity of the heterogeneous functional equivalents in the intermediate state; determine whether each of the quantities exceeds a preset value; and if the quantity exceeds the preset value, configure and generate the first scheduling policy and/or the second scheduling policy according to numbers corresponding to the heterogeneous functional equivalents in the non-credible and intermediate states.

Alternatively, the transceiver of the feedback controller is configured to acquire an external control parameter, and the processor of the feedback controller is configured to generate the first scheduling policy and/or the second scheduling policy according to the external control parameter and the decision information.

With reference to the second aspect, in still another implementation, the input proxy is configured to receive the first scheduling policy, and replace the heterogeneous functional equivalent according to the number corresponding to the heterogeneous functional equivalent indicated by the first scheduling policy.

With reference to the second aspect, in still another implementation, the second scheduling policy is used to instruct the heterogeneous functional equivalent that is to be changed to perform a change of disconnecting, initializing, abnormality recovering, refactoring or restructuring.

In the system provided in this aspect, the reliability and security of the heterogeneous functional equivalents in the system can be measured according to the decision information of the output decider, and thereby a risky heterogeneous functional equivalent can be replaced or processed. In this way, the security and reliability of the system can be improved.

According to a third aspect, this disclosure further provides a computer storage medium, where the computer storage medium may store a program, and when the program executes, some or all of the steps in embodiments of the output-decision-based negative feedback control method provided in this disclosure can be implemented.

BRIEF DESCRIPTION OF THE DRAWINGS

In order to describe the technical solutions in embodiments of this disclosure more clearly, the followings briefly describes the accompanying drawings necessary for the embodiments. Apparently, persons of ordinary skill in the art may derive other drawings from these accompanying drawings without creative efforts.

DETAILED DESCRIPTION OF THE EMBODIMENTS

In order to make persons skilled in the art better understand the technical solutions in the embodiments of the present disclosure, and to make the objectives, features and advantages of the embodiments of the present disclosure more comprehensible, the technical solutions in the embodiments of the present disclosure are described below in further detail with reference to the accompanying drawings.

Figure 1:
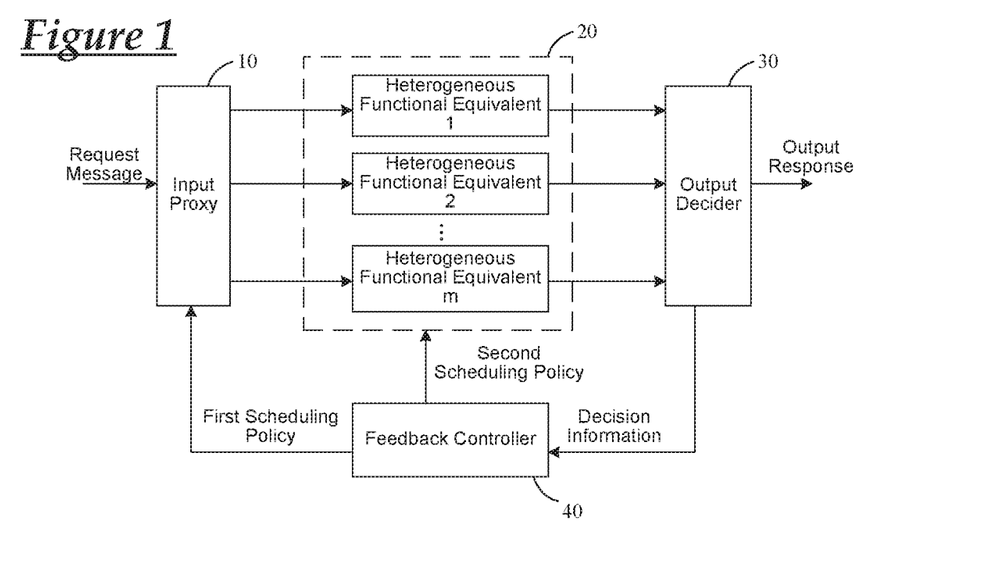
FIG. 1 is a schematic structural diagram of a network system according to an embodiment of this disclosure.

Prior to the description of the technical solutions in the embodiments of the present disclosure, an application scenario of the embodiments of the present disclosure is first described with reference to an accompanying drawing. Referring to FIG. 1, which is a schematic structural diagram of a network system according to an embodiment of the present disclosure. The system may be applied to an apparatus or a system including software and hardware. Specifically, the system includes an input proxy, at least one heterogeneous functional equivalent, an output decider and a feedback controller. In addition, the system may further include other network equipment such as an output proxy, a redundancy controller and the like, which is not limited in the present invention.

As shown in FIG. 1, the input proxy 10 is configured to receive an external request message or an input stimulus and allocate the external request or the input stimulus to an associated heterogeneous functional equivalent according to an instruction of the feedback controller. The external request or the input stimulus carries information on requesting for a service.

Optionally, the input proxy 10 is further configured to acquire a distribution policy. The distribution policy is used to indicate that to which heterogeneous functional equivalent that the external request or the input stimulus will be sent by the input proxy 10 to perform. The input proxy then forwards the external request or the input stimulus to a corresponding heterogeneous functional equivalent according to the distribution policy. The distribution policy may be preset in the input proxy internally, or may be acquired from other network equipment externally.

A heterogeneous functional equivalent set 20 includes at least one heterogeneous functional equivalent, e.g., a heterogeneous functional equivalent 1, a heterogeneous functional equivalent 2, . . . , and a heterogeneous functional equivalent m. Each of the heterogeneous functional equivalents is configured to receive the request message or the input stimulus from the input proxy 10 to analyze and generate an output response and send the output response to the output decider.

The heterogeneous functional equivalents included in the heterogeneous functional equivalent set 20 include heterogeneous functional equivalents having the same function. A scale of each of the heterogeneous functional equivalent may be a system, a sub-system, a module, a function, an intermediate body, a component and the like. Each of the heterogeneous functional equivalents may be implemented by software, hardware or both, and may be structured in a rigid form or in a refactored, restructured, or software-defined form, which is not limited in this disclosure.

Further, "refactored" means dynamic allocation and function transformation are implemented on all or some of the logical resources of software and hardware. "Restructured" means all or some of the components in a component-based apparatus are restructured. "Software-defined" means a processing unit and a control unit of the heterogeneous functional equivalent are separated so that a user may define a service function according to an abstract programming interface. The heterogeneous functional equivalent may implement function expression in both rigid and flexible manners, which is not limited the present disclosure.

The output decider 30 is configured to receive the output response of at least one heterogeneous functional equivalent, decide upon all of the acquired output responses, and determine a decided output result as an output response provided externally by the system.

In addition, the output decider 30 is further configured to collect the output responses of all of the heterogeneous functional equivalents, divide these output responses into sets, each of which includes a number of a heterogeneous functional equivalent corresponding thereto, and analyze credibility of the heterogeneous functional equivalent in each of the sets. The heterogeneous functional equivalents are divided into three levels according to credibility, that is, credible, intermediate between credible and non-credible, and non-credible, which are in a descending order of credibility. The output decider 30 is configured to send decision information to the feedback controller.

The feedback controller 40 is configured to receive the decision information from the output decider 30, and generate a scheduling policy, e.g., a first scheduling policy and a second scheduling policy, according to the decision information. The scheduling policy is used to instruct the at least one heterogeneous functional equivalent to be changed so that the output response of the changed heterogeneous functional equivalent tends to be consistent with others, thus improving security and reliability of the system.

Figure 2:
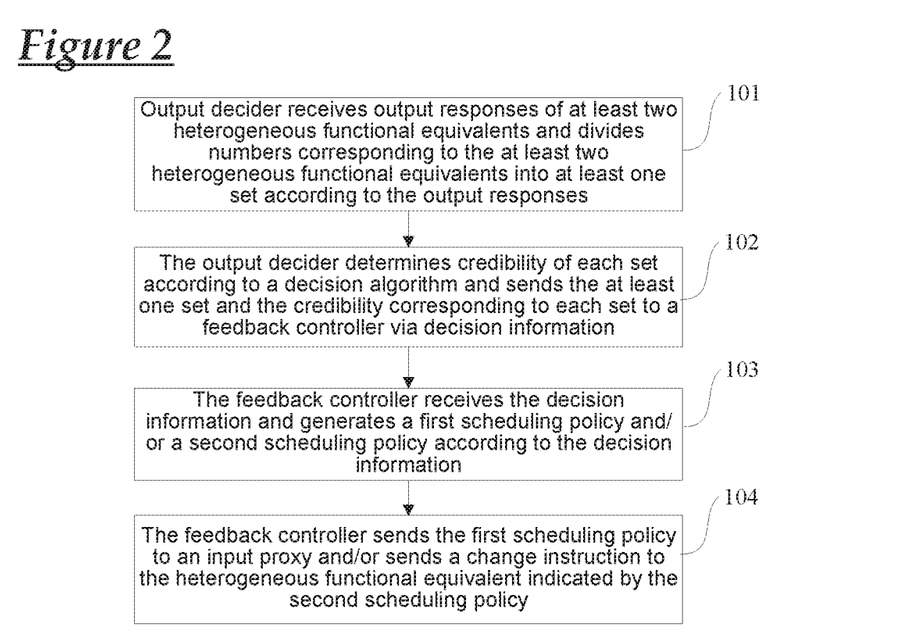
FIG. 2 is a flowchart of an output-decision-based negative feedback control method according to an embodiment of this disclosure.

An output-decision-based negative feedback control method according to an embodiment of the present disclosure is described below in detail. As shown in FIG. 2, which is a schematic flowchart of the method according to this embodiment, the method specifically includes the following steps.

Step 101: An output decider receives output responses of at least two heterogeneous functional equivalents, and divides numbers corresponding to the at least two heterogeneous functional equivalents into at least one set according to the output responses.

Each of the heterogeneous functional equivalents outputs an output service response. The responses outputted by different heterogeneous functional equivalents may be the same or different. The output decider collects and divides the acquired output responses in such a way that numbers corresponding to the heterogeneous functional equivalents having the same output response are put into a set, and numbers corresponding to the heterogeneous functional equivalents having different output responses are put into individual sets. Each of the heterogeneous functional equivalents uniquely corresponds to one number.

For example, if there are three heterogeneous functional equivalents that are numbered 1, 2, and 3, and the output responses of the heterogeneous functional equivalents 1 and 2 are both A while the output response of the heterogeneous functional equivalent 3 is B, then the divided sets are a first set {1, 2} and a second set {3}.

Step 102: The output decider determines credibility of each set according to a decision algorithm, and sends the at least one set and the credibility corresponding to each set to a feedback controller via decision information.

Optionally, the decision algorithm includes a majority decision and a weighted decision. The determining, by the output decider, of the credibility of each set according to the decision algorithm includes determining, by the output decider, the credibility of each set according to the majority decision or the weighted decision.

The majority decision means that, for all of the collected output responses, the set in which the output responses are the same and the quantity of the output responses is in maximum is considered as credible, while the others are considered as non-credible. If there is no such a set with maximum quantity of output responses but two or more sets having the same quantity of output responses, it is determined that the credibility of these sets are intermediate between credible and non-credible.

The weighted decision means that a weight is configured for each of the heterogeneous functional equivalents, and then a weight sum of all of the divided sets are calculated and compared so as to determine the credibility of each of the sets according to a comparison result. For example, for the first set {1, 2} and the second set {3} in this embodiment, assuming that the heterogeneous functional equivalent 1 has a preset weight of x, the heterogeneous functional equivalent 2 has a preset weight of y, and the heterogeneous functional equivalent 3 has a preset weight of z, if $x+y>z$, the first set is decided as credible, while the second set is decided as non-credible; if $x+y=z$, both of the first set and the second set are intermediate between credible and non-credible; and if $x+y<z$, the second set is decided as credible, while the first set is decided as non-credible.

Further, before the determining, by the output decider, of the credibility of each set according to the majority decision or the weighted decision, the method further includes acquiring, by the output decider, a decision parameter, where the decision parameter includes a given weight and a threshold to be compared, and determining, by the output decider, the credibility of each set according to the decision parameter and the decision algorithm. Specifically, the weight and the threshold may be set depending on the operation condition and environment of the actual heterogeneous functional equivalents, which is not limited in this embodiment.

Step 103: The feedback controller receives the decision information and generates a first scheduling policy and/or a second scheduling policy according to the decision information, where the first scheduling policy is used to indicate the number corresponding to the heterogeneous functional equivalent to be rescheduled by an input proxy, and the second scheduling policy is used to indicate the number corresponding to the heterogeneous functional equivalent to be changed.

In an implementation of generating the first scheduling policy and/or the second scheduling policy, the feedback controller acquires an external control parameter and generates the first scheduling policy and/or the second scheduling policy according to the external control parameter and the decision information, where the external control parameter may be used to indicate a probability that the number of the heterogeneous functional equivalent in each of the sets is configured in the first scheduling policy and/or the second scheduling policy.

The external control parameters corresponding to the credibility of the sets are different, and a relationship between the first/second scheduling policy and a target parameter is shown in the following Table 1.

TABLE 1

| Credibility | External control parameter (probability) for first scheduling policy | External control parameter (probability) for second scheduling policy |
|---|---|---|
| Credible | 10% | 15% |
| Intermediate between credible and non-credible | 50% | 55% |
| Non-credible | 80% | 85% |

As shown in Table 1, taking the generating of the first scheduling policy as an example, for the divided first set {1, 2} and second set {3}, a dividing process is specifically as follows. It is assumed that the credibility corresponding to the first set {1, 2} is credible, and a probability of generating the first scheduling policy is 10%. For the heterogeneous functional equivalent 1, a random number 0.3 (30%) is acquired, which is greater than the probability of 10% indicated by the external control parameter. Therefore, the number "1" corresponding to the heterogeneous functional equivalent 1 is configured in the first scheduling policy. Similarly, a random number 0.06 (6%) is generated for the heterogeneous functional equivalent 2, and the random number is compared with the indicated probability of 10%. If the random number is less than or equal to the probability, e.g., 10%, indicated by the external control parameter, the number "2" corresponding to the heterogeneous functional equivalent 2 is not configured in the first scheduling policy. In this example, the fact that the random number of the heterogeneous functional equivalent 2 is less than the external control parameter is considered to be normal. Therefore, this heterogeneous functional equivalent is not to be scheduled or changed.

Similarly, a process of generating the second scheduling policy by the feedback controller according to the decision information is the same as the process of generating the first scheduling policy. Specifically, a random number for the second set {3} is also generated and then compared with a probability corresponding to credibility. When the random number is greater than the probability indicated by the external control parameter, the number corresponding to the heterogeneous functional equivalent is configured in the second scheduling policy and the heterogeneous functional equivalent is to be changed.

Optionally, another implementation of generating the first scheduling policy and/or the second scheduling policy is described. The feedback controller counts the quantity of the heterogeneous functional equivalents whose credibility are non-credible and the quantity of the heterogeneous functional equivalents whose credibility are intermediate between credible and non-credible, and determines whether each of the quantities exceeds a preset value. If it exceeds the preset value, then configures, in the first scheduling policy and/or the second scheduling policy, numbers corresponding to the heterogeneous functional equivalents whose quantity exceeds the preset value. The first scheduling policy and/or the second scheduling policy is used to instruct to replace the numbers of the heterogeneous functional equivalents corresponding to the quantity.

It should be noted that, during the first scheduling policy and the second scheduling policy are generated by counting the quantity of heterogeneous functional equivalents, since the set of heterogeneous functional equivalents with credibility of credible is generally considered as secure or functionally normal, the heterogeneous functional equivalents in the "credible" state is not to be changed. Therefore, the quantity of heterogeneous functional equivalents in the "credible" state does not need to be counted. As the heterogeneous functional equivalents whose quantity exceeds the preset value are decided as in the non-credible or intermediate state, these heterogeneous functional equivalents are correspondingly processed. Specifically, the numbers corresponding to these heterogeneous functional equivalents are configured in the first or second scheduling policy, or in both. This may be configured depending on a system requirement, and is not limited in this embodiment.

For example, it is assumed that the quantity of heterogeneous functional equivalents with credibility of non-credible is 1 and the preset value is 0, since the quantity exceeds the preset value, the number of the non-credible heterogeneous functional equivalent is configured in the first or second scheduling policy, or in both.

In addition, the preset values in this embodiment may be the same or may be different. Moreover, the preset value may be configured and generated by the system in advance, or may be acquired externally.

Step 104: The feedback controller sends the first scheduling policy to the input proxy, and/or sends a change instruction to the heterogeneous functional equivalent indicated by the second scheduling policy.

The input proxy receives the first scheduling policy from the feedback controller. For example, if the first scheduling policy instructs to replace the heterogeneous functional equivalent 1, the input proxy removes the corresponding heterogeneous functional equivalent 1 according to the number "1" corresponding to the heterogeneous functional equivalent indicated by the first scheduling policy, so that during rescheduling, the input proxy does not select the heterogeneous functional equivalent 1, but may send an external request to other heterogeneous functional equivalents for outputting service responses. Once the heterogeneous functional equivalent 1 changes and becomes normal, a request message is then sent to the heterogeneous functional equivalent 1.

The feedback controller generates the change instruction according to the second scheduling policy, and sends the change instruction to the corresponding heterogeneous functional equivalent, so that the heterogeneous functional equivalent performs a change such as disconnecting, initializing, abnormality recovering, refactoring or restructuring, etc.

"Disconnecting" means that the heterogeneous functional equivalent is shut down and do not output a response externally. "Initializing" includes performing a factory reset to the heterogeneous functional equivalent. "Abnormality recovering" includes performing antivirus, cleaning, or other operations other than the initializing on the heterogeneous functional equivalent. "Refactoring" or "restructuring" means performing operations such as code refactoring or restructuring on the heterogeneous functional equivalent implemented by software codes.

In the output-decision-based feedback control method provided in this embodiment, the output decider sends the collected and analyzed output responses from the heterogeneous functional equivalents to the feedback controller via the decision information, so that the feedback controller can generate the scheduling policy according to the decision information and perform operations such as replacing, cleaning, recovering, refactoring or restructuring on the heterogeneous functional equivalent that may be faulty or at low credibility. In this way, the output responses from all of the heterogeneous functional equivalents in the system tend to be consistent, and the heterogeneous functional equivalent in which a fault may occur can be known beforehand and thus processed, thus avoiding the fault to be discovered and processed until it occurs. As such, this method improves reliability and security of the software and hardware apparatuses.

In addition, in the method provided in this disclosure, by means of scheduling and changing the selected heterogeneous functional equivalent, the collaborative cheating among a plurality of heterogeneous functional equivalents can also be avoided, and thus the system security is further improved. The "collaborative cheating" includes that the heterogeneous functional equivalents do not show abnormality to outside after being faulty or attacked, but break down or become abnormal at the same time once an attacker sends a uniform instruction to control the plurality of the attacked heterogeneous functional equivalents.

The method provided in the present disclosure is described in detail by using specific embodiments.

It is assumed that a system includes three heterogeneous functional equivalents numbered 1, 2, and 3. Output responses of the three heterogeneous functional equivalents include the following three cases.

Case 1: The output responses of the three heterogeneous functional equivalents are the same, which is A.

Case 2: One of the three heterogeneous functional equivalents has an output response different from those of the other two. For example, the output responses are A, A, and B respectively, in an ascending order of the heterogeneous functional equivalent numbers.

Case 3: The output responses of the three heterogeneous functional equivalents are different from each other. For example, the output responses are A, B, and C, respectively.

A control method for the feedback controller is described below in detail with respect to the three cases.

Embodiment 1

For Case 1, the output decider first performs a set division to generate a first set $\{1, 2, 3\}$, and then determines credibility for the three output responses according a decision algorithm such as a majority decision, e.g., determines that the credibility is credible and finally sends decision information including the first set $\{1, 2, 3\}$ and "credible" to the feedback controller.

The feedback controller receives the decision information and acquires an external control parameter. For example, the external control parameter is 33.3%. A random number for each of the heterogeneous functional equivalents is generated and compared with the external control parameter of 33.3%. If the random number is greater than 33.3%, the heterogeneous functional equivalent number is used as a first scheduling policy and/or a second scheduling policy. Assuming that the random number of the heterogeneous functional equivalent 1 in this embodiment is less than 33.3%, the heterogeneous functional equivalent number 1 is configured in the first scheduling policy and/or the second scheduling policy.

The feedback controller sends an instruction carrying the first scheduling policy 1 to the input proxy, so that the input proxy does not send an external request to the heterogeneous functional equivalent 1 during rescheduling of the heterogeneous functional equivalents. Alternatively, the feedback controller sends an instruction carrying the second scheduling policy to the heterogeneous functional equivalent 1, so that the heterogeneous functional equivalent performs a change such as cleaning, recovering, refactoring or restructuring, etc.

In this embodiment, when the output responses of the heterogeneous functional equivalents are the same, a heterogeneous functional equivalent is randomly selected for a change such as replacing, cleaning, recovering, refactoring or restructuring, thereby ensuring security and reliability of software and hardware systems.

Embodiment 2

For Case 2, the output decider receives the output responses A, A, and B of the three heterogeneous functional equivalents, and performs a set division to generate a first set $\{1, 2\}$ and a second set $\{3\}$. Elements in the sets are the numbers corresponding to the heterogeneous functional equivalent.

The output decider determines credibility for the three output responses according to a decision algorithm. For example, the first set $\{1, 2\}$ is determined as credible, while the second set $\{3\}$ is determined as non-credible. Then, decision information is generated. The decision information includes the first set $\{1, 2\}$ and the second set $\{3\}$, as well as information indicating that the first set $\{1, 2\}$ is credible and the second set $\{3\}$ is non-credible.

The feedback controller receives the decision information from the output decider, and then generates a first scheduling policy and/or a second scheduling policy according to an external control parameter. For example, by means of comparing a generated random number with a probability indicated by the external control parameter, the first scheduling policy is generated to correspond to the heterogeneous functional equivalent number 3, and the second scheduling policy is generated to correspond to the heterogeneous functional equivalent number 3 as well.

Another manner for generating the first scheduling policy and/or the second scheduling policy includes: counting the quantity of the heterogeneous functional equivalent numbers in the first set and the second set, respectively, and determining whether each of the quantities exceeds a preset value. In this embodiment, the quantity of the heterogeneous functional equivalents in the first set is 2. Assuming that the preset value is 2, the preset value is not exceeded and thus the first scheduling policy and second scheduling policy are generated to be empty, that is, the heterogeneous functional equivalents corresponding to the first set are not to be changed. In contrast, if the preset value is exceeded, the two heterogeneous functional equivalent numbers are configured in the first scheduling policy and/or the second scheduling policy.

The feedback controller sends the first scheduling policy to the input proxy, and/or sends a change instruction to the heterogeneous functional equivalent indicated by the second scheduling policy.

In this embodiment, by means of the output decider the heterogeneous functional equivalents having different output responses serve as targets to be changed, and then are performed a change such as replacing, cleaning, recovering, refactoring or restructuring, thereby preventing possible faults that the heterogeneous functional equivalents may cause, and thus ensuring security and reliability of the software and hardware systems.

Embodiment 3

For Case 3, the output responses of the three heterogeneous functional equivalents are different from each other. For example, the output responses are A, B, and C, respectively, and the output decider generates three sets, that is, a first set {1}, a second set {2} and a third set {3}, respectively.

The output decider calculates credibility for each of the sets and generates a decision result that credibility of each of the three heterogeneous functional equivalents is intermediate between credible and non-credible. Then, the output decider sends the three sets and the corresponding credibility to the feedback controller via decision information.

The feedback controller receives the decision information, performs configuration for the three heterogeneous functional equivalents according to an external control parameter, and generates a first or second scheduling policy, or both.

For example, during the generating of the first scheduling policy, a probability for the external control parameter is 50%, and a random number of 45% is generated for the first set {1}, which is less than the external control parameter of 50%. Therefore the heterogeneous functional equivalent 1 is not configured in the first scheduling policy. Similarly, if the random number of the first set {1} is 65%, which is greater than the external control parameter of 50%, the heterogeneous functional equivalent number 1 is configured in the first scheduling policy as a heterogeneous functional equivalent to be replaced. Similarly, the second set {2} and the third set {3} are also decided by using the same method.

Similarly, a method for generating the second scheduling policy is the same as the method for generating the first scheduling policy, but a probability indicated by the external control parameter may be different. A specific probability may be set depending on an actual condition, which is not limited in this disclosure.

The feedback controller sends the first scheduling policy to the input proxy, and sends the second scheduling policy to the corresponding heterogeneous functional equivalent.

In this embodiment, by means of performing an operation such as replacing, cleaning, recovering, refactoring or restructuring on the heterogeneous functional equivalents having intermediate credibility, thereby preventing possible faults that the heterogeneous functional equivalents may cause, and thus ensuring security and reliability of the software and hardware systems.

Corresponding to the method provided in the foregoing embodiment, an embodiment further provides an output-decision-based negative feedback control system. As shown in FIG. 1, the system includes an input proxy 10, at least two heterogeneous functional equivalents 20, an output decider 30 and a feedback controller 40.

Each of the heterogeneous functional equivalents 20 are configured to receive an external service request, generate an output response according to the external service request and send the output response to the output decider 30.

Figure 3:
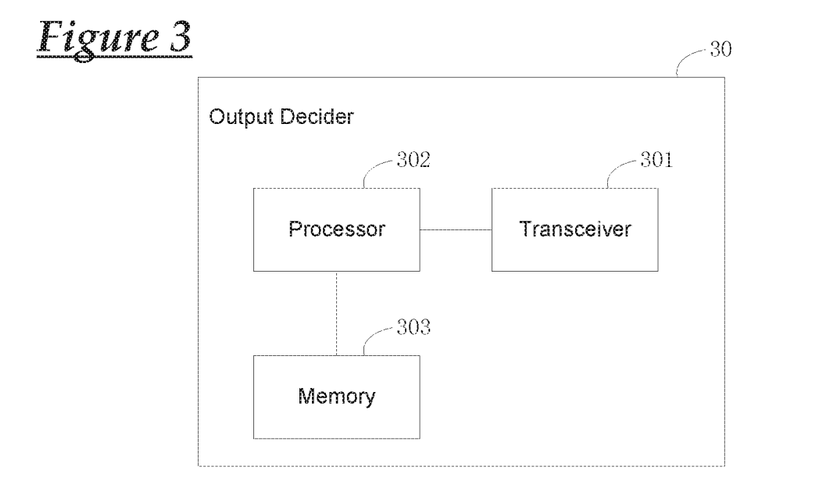
FIG. 3 is a schematic structural diagram of an output decider according to an embodiment of this disclosure.

Further, as shown in FIG. 3, the output decider 30 includes a transceiver 301, a processor 302 and a memory 303. The transceiver 301 is configured to receive the output responses of the at least two heterogeneous functional equivalents. The processor 302 is configured to divide numbers corresponding to the at least two heterogeneous functional equivalents into at least one set according to the output responses, where each set includes a number of at least one heterogeneous functional equivalents having a same output response, and determine credibility of each set according to a decision algorithm. The transceiver 301 is further configured to send the at least one set and the credibility corresponding to each set to the feedback controller via decision information.

Figure 4:
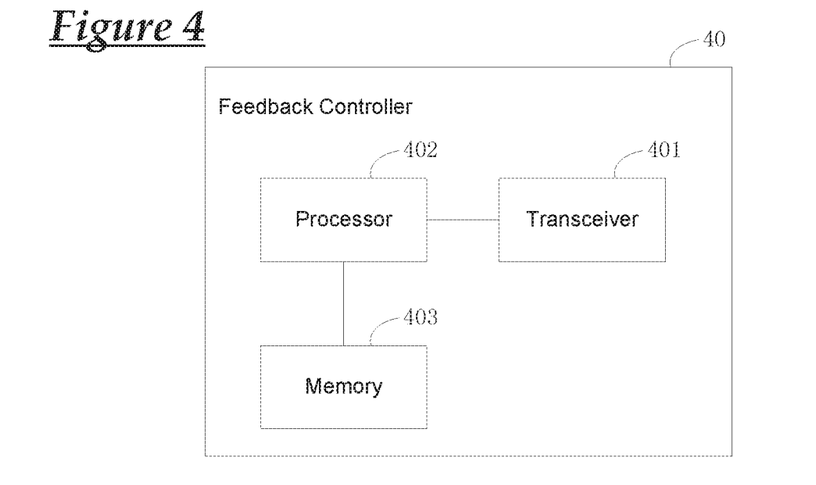
FIG. 4 is a schematic structural diagram of a feedback controller according to an embodiment of this disclosure.

As shown in FIG. 4, the feedback controller 40 includes a transceiver 401, a processor 402 and a memory 403. The transceiver 401 is configured to receive the decision information. The processor 402 is configured to generate a first scheduling policy and/or a second scheduling policy according to the decision information. The first scheduling policy is used to indicate the number corresponding to the heterogeneous functional equivalent to be scheduled by the input proxy, and the second scheduling policy is used to indicate the number corresponding to the heterogeneous functional equivalent to be changed. The transceiver 401 is further configured to send the first scheduling policy to the input proxy 10, and/or send a change instruction to the heterogeneous functional equivalent indicated by the second scheduling policy.

Optionally, in a specific implementation, the decision algorithm includes a majority decision and a weighted decision. The processor 302 of the output decider is specifically configured to determine the credibility of each set according to the majority decision or the weighted decision.

Optionally, in another specific implementation, the credibility is used to indicate a state of each of the heterogeneous functional equivalents corresponding to each number included in each set is credible, non-credible, or intermediate between credible and non-credible.

The processor 402 of the feedback controller is specifically configured to count the quantity of the heterogeneous functional equivalents in the non-credible state and the quantity of the heterogeneous functional equivalents in the intermediate between credible and non-credible state, determine whether each of the quantities exceeds a preset value, and, configure to generate the first scheduling policy and/or the second scheduling policy according to the numbers corresponding to the heterogeneous functional equivalents in the non-credible and intermediate states, if the quantity exceeds the preset value.

Alternatively, the transceiver 401 of the feedback controller is configured to acquire an external control parameter, and the processor of the feedback controller is configured to generate the first scheduling policy and/or the second scheduling policy according to the external control parameter and the decision information.

Optionally, in another specific implementation, the input proxy 10 is configured to receive the first scheduling policy, and replace the corresponding heterogeneous functional equivalent according to the number corresponding to the heterogeneous functional equivalent indicated by the first scheduling policy.

Optionally, in another specific implementation, the second scheduling policy is used to instruct the heterogeneous functional equivalent to be changed to perform a change such as disconnecting, initializing, abnormality recovering, refactoring or restructuring.

It should be noted that, the output decider 30 and the feedback controller 40 may be integrated into network equipment. The equipment includes functional devices such as a transceiver, a processor, and a memory.

Further, the processor may be a central processing unit (CPU), a network processor (NP) or a combination thereof. The processor may further include a hardware chip. The hardware chip may be an application-specific integrated circuit (ASIC), a programmable logic device (PLD) or a combination thereof. The PLD may be a complex programmable logic device (CPLD), a field-programmable gate array (FPGA), a generic array logic (GAL) or any combination thereof.

The memory may include a volatile memory, e.g., a random access memory (RAM), or may include a non-volatile memory, e.g., a flash memory, a hard disk drive (HDD), or a solid-state drive (SSD), or may include a combination of the above-mentioned memories. The memory may store a program or codes therein. The processor in the network equipment may implement a function of the network equipment by executing the program or codes.

The transceiver may be configured to receive or send data. Under the control of the processor, the transceiver may send data to the network equipment such as the heterogeneous functional equivalent or the input proxy, and receive data sent by other network equipment.

In an embodiment of the present disclosure, the transceiver may be configured to implement steps of the output-decision-based negative feedback control method in the embodiment shown in FIG. 2. In addition, the transceiver, the processor, and the memory in the foregoing embodiment may be implemented by virtual units or modules. For example, the transceiver may be implemented by a receiving unit and a sending unit. The processor may be implemented by a processing unit. The memory may be implemented by a storage unit.

During specific implementation, the present disclosure further provides a computer storage medium, where the computer storage medium may store a program. When the program is executed, some or all of the steps in the embodiments of the output-decision-based negative feedback control method provided in the present disclosure can be performed. The storage medium may be a magnetic disk, an optical disc, or a read-only memory (ROM), or a RAM.

Persons skilled in the art may clearly understand that, the technologies in the embodiments of the present disclosure may be implemented by software plus a necessary general hardware platform. Based on such an understanding, the technical solutions in the embodiments of the present disclosure essentially or the part contributing to the prior art may be implemented in a form of a software product. The software product may be stored in a storage medium, e.g., a ROM/RAM, a magnetic disk, or an optical disc, and includes instructions for instructing a computer device (which may be a personal computer, a server, or network equipment) to perform the methods described in the embodiments of the present disclosure or in some parts in the embodiments.

In this specification, identical or similar parts in the embodiments may be acquired with reference to each other. Particularly, the foregoing embodiments are basically similar to the method embodiments, and therefore are described briefly. For related parts, refer to the descriptions in the method embodiments.

The embodiments of the present invention described above are not intended to limit the protection scope of the present invention.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

What is claimed is:

1. An output-decision-based negative feedback control method, comprising the steps of:
   receiving, by an output decider, output responses of at least two heterogeneous functional equivalents, and dividing numbers corresponding to the at least two heterogeneous functional equivalents into at least one set according to the output responses;

determining, by the output decider, credibility of each set according to a decision algorithm, and sending the at least one set and the credibility corresponding to each set to a feedback controller via decision information;

receiving, by the feedback controller, the decision information, and generating a first scheduling policy and/or a second scheduling policy according to the decision information, wherein the first scheduling policy is used to indicate the number corresponding to the heterogeneous functional equivalent to be scheduled, and the second scheduling policy is used to indicate the number corresponding to the heterogeneous functional equivalent to be changed; and sending, by the feedback controller, the first scheduling policy to an input proxy, and/or sending a change instruction to the heterogeneous functional equivalent indicated by the second scheduling policy.

2. The method according to claim 1, wherein the decision algorithm comprises a majority decision and a weighted decision, and the determining by the output decider of the credibility of each set according to the decision algorithm comprises:

determining, by the output decider, the credibility of each set according to the majority decision or the weighted decision.

3. The method according to claim 2, wherein the credibility is used to indicate a state of each heterogeneous functional equivalent in each set is credible, non-credible, or intermediate between credible and non-credible; and the generating by the feedback controller of the first scheduling policy and/or the second scheduling policy according to the decision information comprises:

counting, by the feedback controller, a quantity of the heterogeneous functional equivalents in the non-credible state and a quantity of the heterogeneous functional equivalents in the intermediate state;

determining whether each of the quantities exceeds a preset value, respectively; and if the quantity exceeds the preset value, configuring and generating the first scheduling policy and/or the second scheduling policy according to the numbers corresponding to heterogeneous functional equivalents in the non-credible and intermediate states; or acquiring, by the feedback controller, an external control parameter, and generating the first scheduling policy and/or the second scheduling policy according to the external control parameter and the decision information.

4. The method according to claim 1, further comprising:

receiving, by the input proxy, the first scheduling policy, and replacing the heterogeneous functional equivalent corresponding to the number in the first scheduling policy.

5. The method according to claim 1, wherein that the second scheduling policy is used to indicate the number corresponding to the heterogeneous functional equivalent that is to be changed comprises:

the second scheduling policy is used to instruct the heterogeneous functional equivalent that is to be changed to perform a change of disconnecting, initializing, abnormality recovering, refactoring or restructuring.

6. An output-decision-based negative feedback control system, comprising:

an input proxy, at least two heterogeneous functional equivalents, an output decider, and a feedback controller, wherein each of the heterogeneous functional equivalents is configured to generate an output response according to an external service request, and send the output response to the output decider;

the output decider comprises a transceiver and a processor, wherein the transceiver is configured to receive the output responses of the at least two heterogeneous functional equivalents; and the processor is configured to divide numbers corresponding to the at least two heterogeneous functional equivalents into at least one set according to the output responses, and determine credibility of each set according to a decision algorithm, and the transceiver is further configured to send the at least one set and the credibility corresponding to each set to the feedback controller via decision information; and the feedback controller comprises a transceiver and a processor, wherein the transceiver is configured to receive the decision information, and the processor is configured to generate a first scheduling policy and/or a second scheduling policy according to the decision information, wherein the first scheduling policy is used to indicate the number corresponding to the heterogeneous functional equivalent that is to be scheduled, and the second scheduling policy is used to indicate the number corresponding to the heterogeneous functional equivalent that is to be changed; and the transceiver is further configured to send the first scheduling policy to the input proxy, and/or send a change instruction to the heterogeneous functional equivalent indicated by the second scheduling policy.

7. The system according to claim 6, wherein the decision algorithm comprises a majority decision and a weighted decision, and the processor of the output decider is configured to determine the credibility of each set according to the majority decision or the weighted decision.

8. The system according to claim 7, wherein the credibility is used to indicate a state of the heterogeneous functional equivalent in each set is credible, non-credible, or intermediate between credible and non-credible; and the processor of the feedback controller is configured to count a quantity of the heterogeneous functional equivalents in the non-credible state and a quantity of the heterogeneous functional equivalents in the intermediate state, to determine whether each or the quantities exceeds a preset value, respectively, and if the quantity exceeds the preset value, to configure and generate the first scheduling policy and/or the second scheduling policy according to the numbers corresponding to the heterogeneous functional equivalents in the non-credible and intermediate states; or the transceiver of the feedback controller is configured to acquire an external control parameter, and the processor of the feedback controller is configured to generate the first scheduling policy and/or the second scheduling policy according to the external control parameter and the decision information.

9. The system according to claim 8, wherein the input proxy is configured to receive the first scheduling policy, and replace the heterogeneous functional equivalent corresponding to the number in the first scheduling policy.

10. The system according to claim 6, wherein the second scheduling policy is used to instruct the heterogeneous functional equivalent that is to be changed to perform a change of disconnecting, initializing, abnormality recovering, refactoring or restructuring.

\* \* \* \* \*